United States Patent
Gonzaga et al.

(10) Patent No.: US 9,707,810 B2
(45) Date of Patent: Jul. 18, 2017

(54) DEVICE FOR DEMOUNTING A TIRED WHEEL AS WELL AS A MACHINE INCLUDING SUCH DEVICE

(71) Applicant: Butler Engineering & Marketing S.p.A., Rolo (Reggio Emilia) (IT)

(72) Inventors: Tullio Gonzaga, Correggio-Reggio Emilia (IT); Silvano Santi, Imola-Bologna (IT)

(73) Assignee: BUTLER ENGINEERING AND MARKETING S.P.A., Rolo (Reggio Emilia) (IT)

( * ) Notice: Subject to any disclaimer, the term of this patent is extended or adjusted under 35 U.S.C. 154(b) by 305 days.

(21) Appl. No.: 14/550,226

(22) Filed: Nov. 21, 2014

(65) Prior Publication Data
US 2015/0144273 A1  May 28, 2015

(30) Foreign Application Priority Data
Nov. 22, 2013 (IT) .............................. VR2013A0252

(51) Int. Cl.
*B60C 25/138* (2006.01)
*B60C 25/05* (2006.01)
*B60C 25/13* (2006.01)

(52) U.S. Cl.
CPC ........ *B60C 25/138* (2013.01); *B60C 25/0506* (2013.04); *B60C 25/0578* (2013.04); *B60C 25/13* (2013.01)

(58) Field of Classification Search
CPC ... B60C 25/13; B60C 25/138; B60C 25/0506; B60C 25/0578
See application file for complete search history.

(56) References Cited

U.S. PATENT DOCUMENTS

| | | | | |
|---|---|---|---|---|
| 6,305,453 B1* | 10/2001 | Zielewicz | ............. | B60C 25/128 157/1.1 |
| 6,629,554 B2* | 10/2003 | Mimura | .............. | B60C 25/0578 157/1.17 |
| 7,100,660 B2* | 9/2006 | Corghi | .................... | B60C 25/13 157/1.28 |
| 7,341,090 B2* | 3/2008 | Gonzaga | ............... | B60C 25/138 157/1.17 |
| 7,500,504 B2* | 3/2009 | Bonacini | ................. | B60C 25/13 157/1.17 |
| 7,591,295 B2* | 9/2009 | Bonacini | ................. | B60C 25/13 157/1.17 |
| 8,408,273 B2* | 4/2013 | Bonacini | ................. | B60C 25/13 157/1.17 |

(Continued)

FOREIGN PATENT DOCUMENTS

EP 1714807 A1 10/2006
EP 2524821 A1 11/2012
WO 2009138322 A1 11/2009

*Primary Examiner* — David B Thomas
(74) *Attorney, Agent, or Firm* — Tutunjian & Bitetto, P.C.

(57) ABSTRACT

A tired wheel comprising at least one base structure, at least one support arm connected to said at least one base structure so as to be angularly displaceable with respect thereto, actuation means for actuating the support arm designed to angularly displace the arm with respect to the at least one base structure, and a demounting tool connected to the support arm so as to be angularly displaceable with respect thereto.

20 Claims, 6 Drawing Sheets

(56) References Cited

U.S. PATENT DOCUMENTS

| | | | | |
|---|---|---|---|---|
| 8,522,851 | B2* | 9/2013 | du Quesne | B60C 25/138 157/1.17 |
| 8,826,962 | B2* | 9/2014 | Bonacini | B60C 25/13 157/1.17 |
| 8,869,864 | B2* | 10/2014 | Bonacini | B60C 25/0578 157/1.24 |
| 9,114,675 | B2* | 8/2015 | Bonacini | B60C 25/13 |
| 9,162,544 | B2* | 10/2015 | Davis | B60C 25/14 |
| 2002/0046814 | A1* | 4/2002 | Vignoli | B60C 25/138 157/1.28 |

* cited by examiner

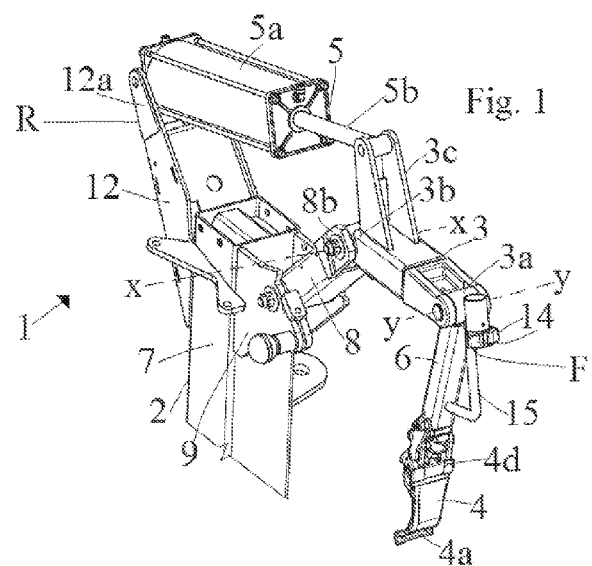
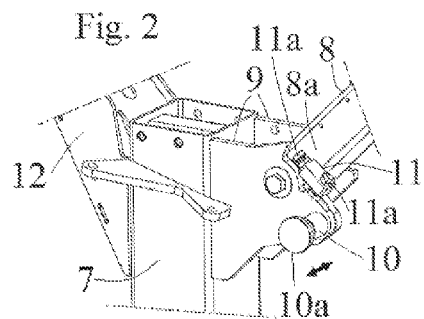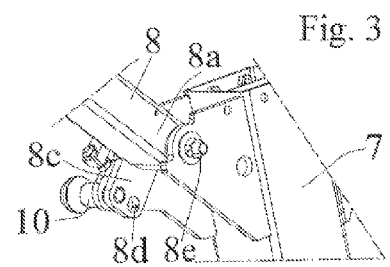
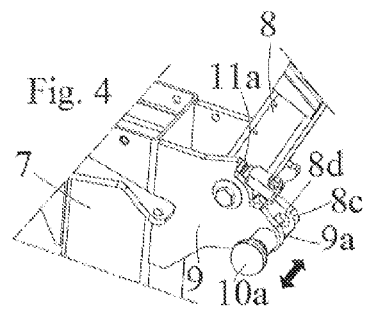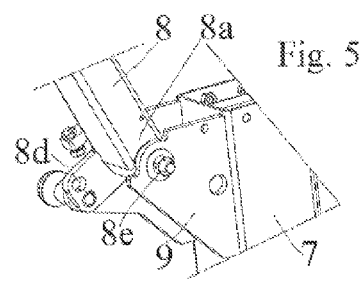

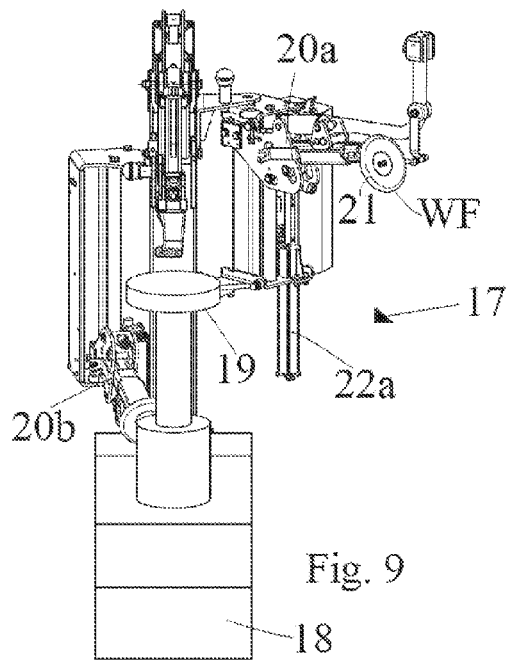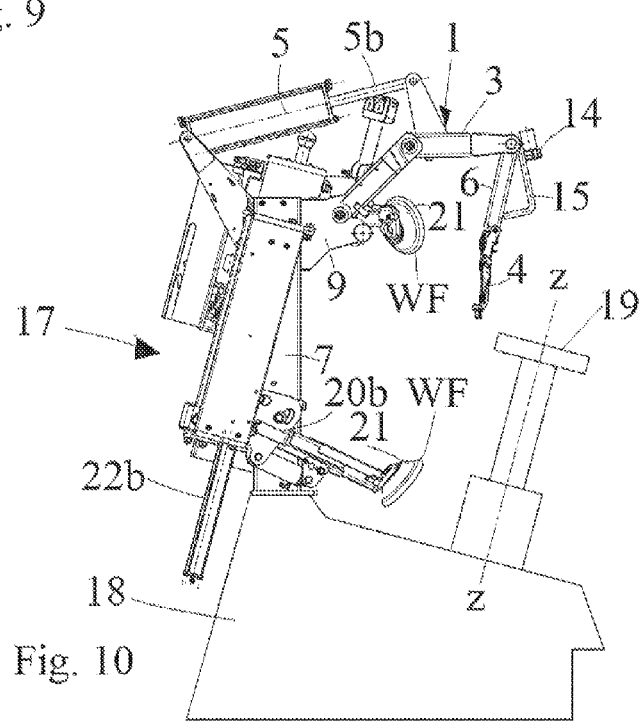

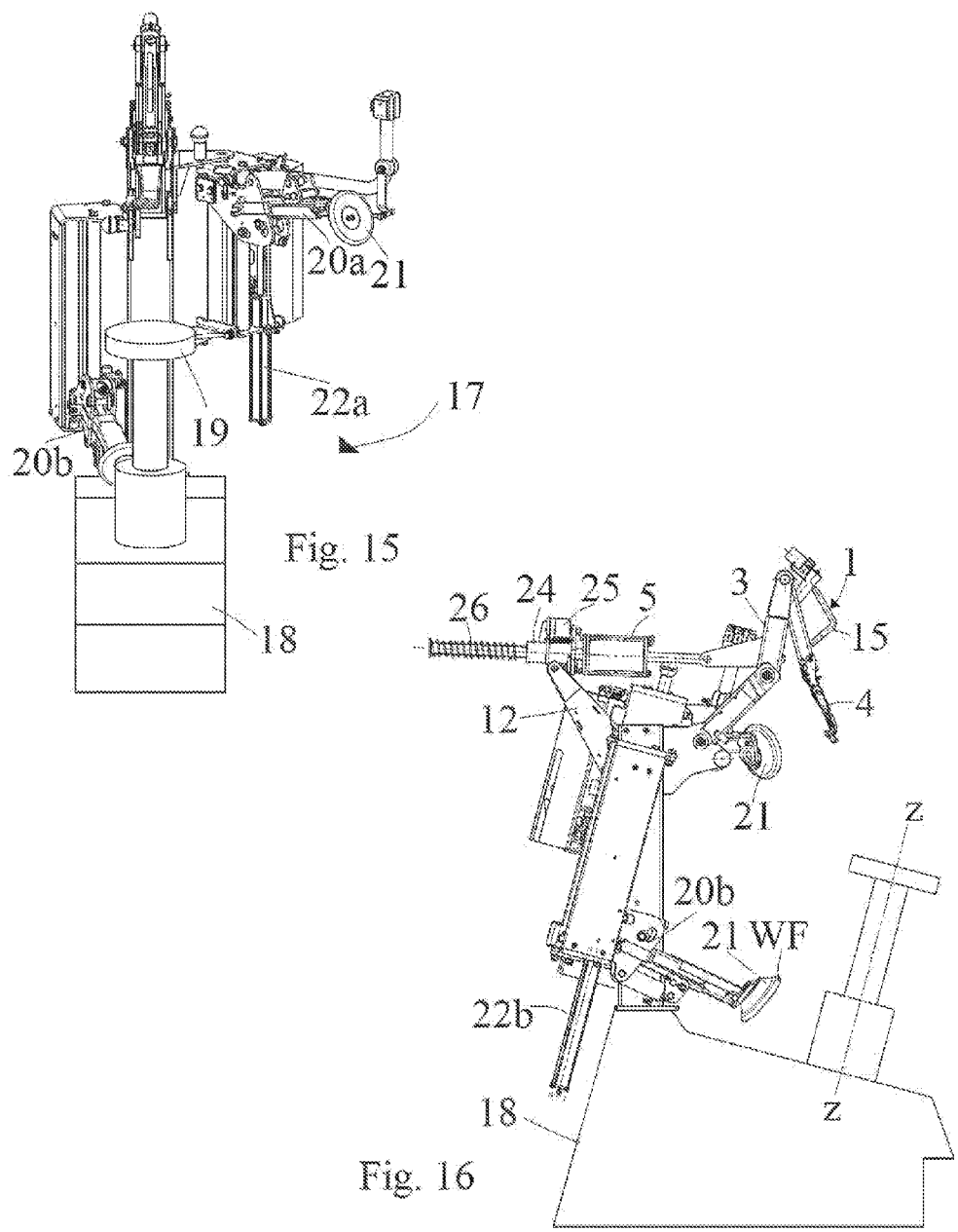

DEVICE FOR DEMOUNTING A TIRED WHEEL AS WELL AS A MACHINE INCLUDING SUCH DEVICE

TECHNICAL FIELD

The present invention includes a device for demounting a tired wheel, as well as a machine comprising such a device. The present invention also includes a process for mounting a tired wheel.

DESCRIPTION OF THE RELATED ART

As known, in order to mount-dismount tires, tired wheel mounting-demounting machines are used, which usually have one or more bead-breaker tools as well as one or more mounting-demounting tools.

With such machines, in order to dismount a tired wheel, first it is necessary to bead break the tire, or in other words, the beads of the tire must be detached or removed from the respective edges of the wheel rim. This is usually carried out through tools, commonly called bead breaker rollers, which are forcibly inserted between a portion of a bead of the tire and a respective portion of a respective edge of the wheel rim, detaching such portions, following which the tired wheel is set in rotation so as to complete the bead breaking of the entire circumferential beads of the tire.

After having completed the bead-breaking operation, the broken beads must be dismounted. In other words, a first bead must be brought beyond the respective first edge of the wheel rim, i.e., outside of the area between the two edges of the wheel rim, following which the other circumferential bead must also be brought beyond the first edge of the wheel rim, so as to complete the demounting.

In order to carry out such demounting operation, a mounting-demounting tool is used, which is usually configured in the shape of a claw or the like and is intended to grasp a portion of a bead of the tire and pull it beyond the first edge of the wheel rim.

Many machines for mounting-demounting tired wheels have been proposed that comprise devices that are controlled substantially manually. In other words, the operator arranges and guides the device manually during the mounting and demounting steps.

Other proposed tire mounting-demounting machines also have automatic mounting-demounting devices, whereby the operator only has to intervene in the initial positioning or adaptation step of the device itself as a function of the size of the wheel and the actuation step of the demounting operations. Afterwards, the device suitably controlled by an actuator proceeds automatically to dismount or mount the wheel.

However, while machines that foresee tools that are positioned manually in the initial work position, they do not ensure that the demounting and mounting are carried out correctly during all of the mounting-demounting steps. Machines with automatic devices require time for positioning the respective mounting-demounting tool in the initial work position as well as for demounting or mounting, more than manually-actuated mounting-demounting machines.

EP2524821A1, EP1714807A1 and WO2009138322A1 teach tire demounting machines according to the current state of the art.

SUMMARY

The present invention provides a new device for demounting a tired wheel.

Another object of the present invention provides a device for demounting a tired wheel that allows the demounting operations to be carried out in a reliable and complete manner.

Another object of the present invention provides a demounting device that can be quickly and correctly adapted in work positions.

Another object of the present invention provides a mounting-demounting machine that is configured with a device as stated above.

Another object of the present invention provides a process for demounting a tired wheel that is simple, quick and effective.

BRIEF DESCRIPTION OF THE DRAWINGS

Other characteristics and advantages of the invention will become clearer from the description of the embodiments of a demounting device, illustrated in the attached drawings, in which:

FIG. 1 is a perspective view slightly from above of a device according to the present invention;

FIGS. 2 and 3 are perspective views from one side and from the other side of a detail of the device of FIG. 1;

FIGS. 4 and 5 are perspective views from one side and from the other side of the detail as illustrated in FIGS. 2 and 3, but in another operating position;

FIGS. 9 and 10 are, respectively, a front view and a side view of a tire mounting-demounting machine according to the present invention, equipped with the device of FIG. 1;

FIGS. 15 and 16 are, respectively, a front view and a side view of a tire mounting-demounting machine according to the present invention equipped with the device according to FIG. 11.

In the attached drawings, identical parts or components are marked with the same reference numbers.

DETAILED DESCRIPTION

Figure 6:
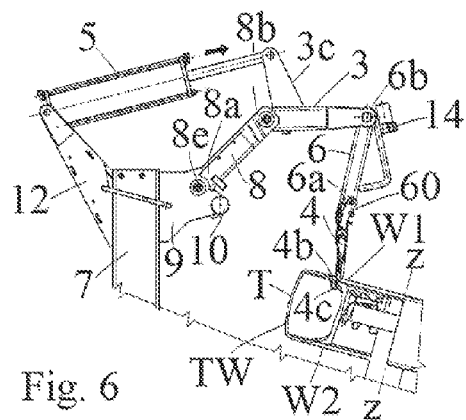
FIGS. 6 to 8 illustrate respective demounting steps through a device according to FIG. 1.
Figure 7:
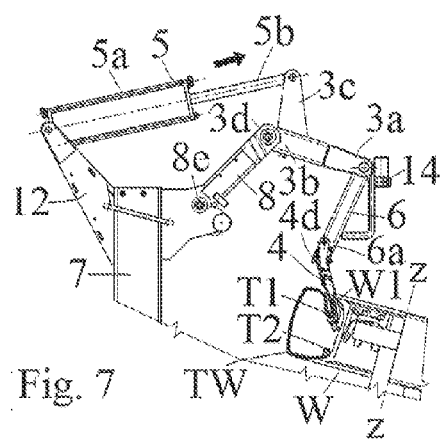

With reference to FIGS. 1 to 10, a device 1 has been illustrated for demounting a tired wheel TW comprising at least one base structure 2, and at least one or more support arms 3 (one according to the embodiment in the Figures) connected to the base structure 2 so as to be angularly displaceable with respect to it. The device 1, as referred to hereafter, may also be used for mounting a tired wheel TW.

Preferably, the support arm 3 is angularly displaceable between a first operating position (see FIG. 6) in which the support arm 3 may, if desired, have a substantially horizontal trim, and a second operating position (see FIG. 7), in which the support arm 3 may, if desired, have a substantially inclined trim, with the distal end 3a distal from the base structure 2 at a level lower than its proximal end 3b, or in any case the distal end 3a in a position lower with respect to the first operating position. The distal end 3a of the support arm 3 in the movement between the first and second operating position is, preferably, brought closer to the tired wheel TW to bead break.

Figure 11:
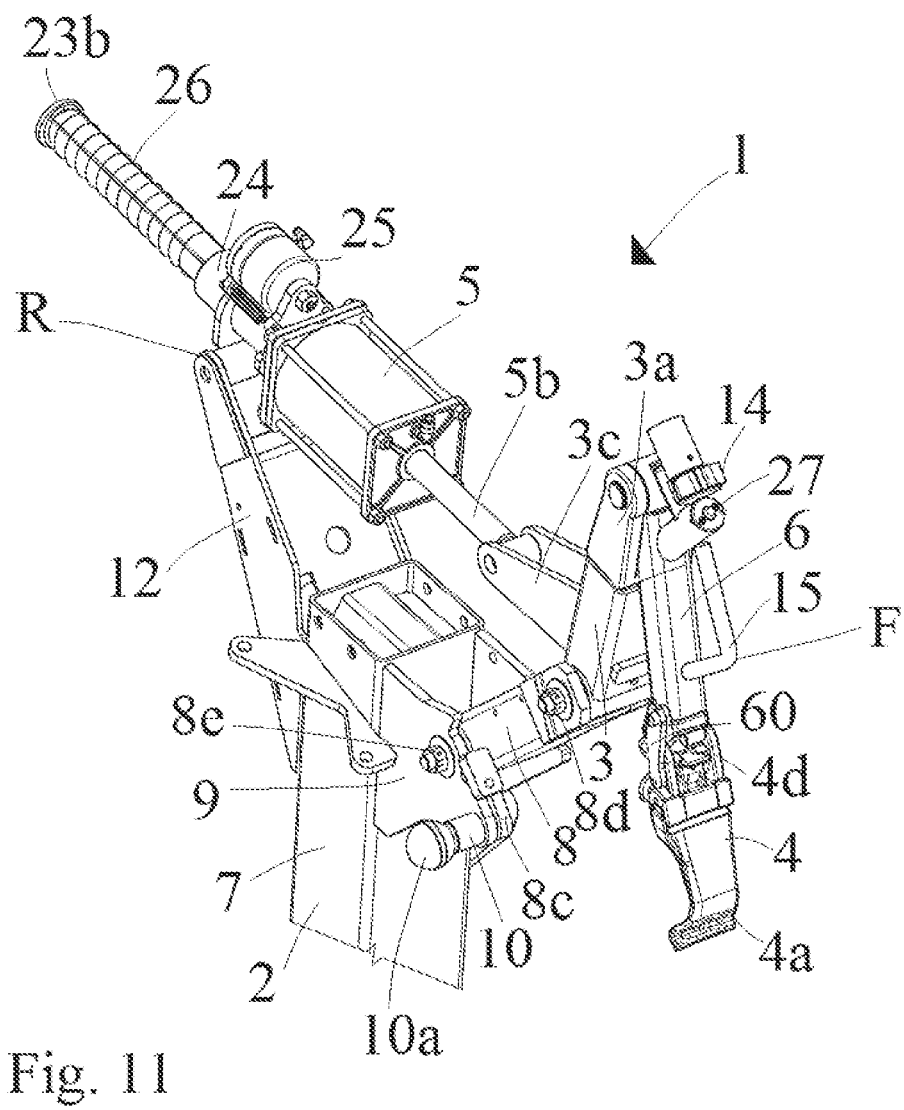
FIG. 11 is a perspective view from slightly above another embodiment of the device according to the present invention.
Figure 12:
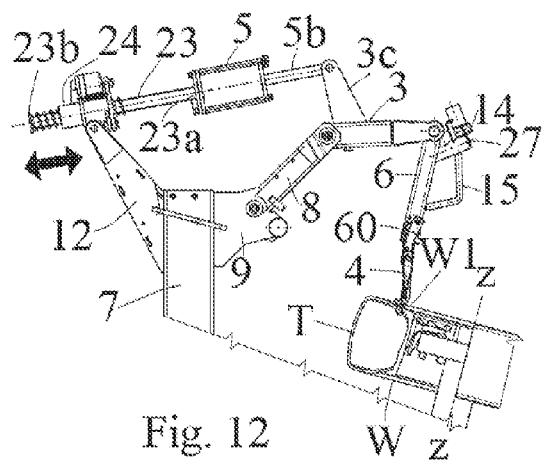
FIGS. 12 to 14 illustrate respective demounting steps utilizing a device according to FIG. 11.
Figure 13:
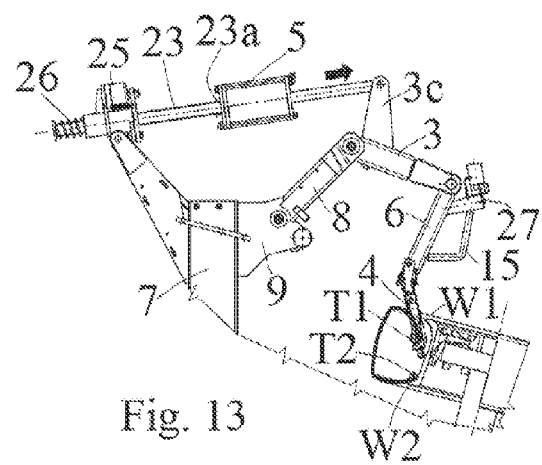
Figure 14:
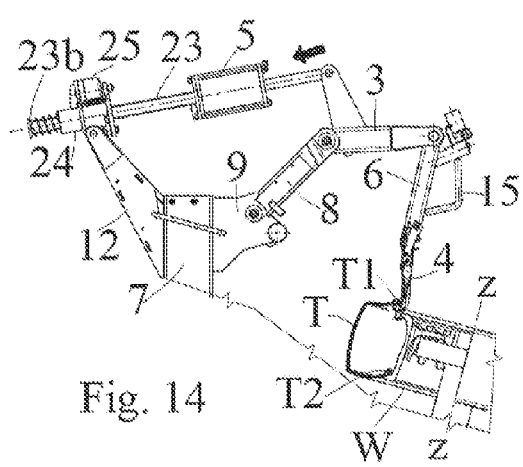

If desired, the support arm 3 may initially be in the rest position (see FIG. 1 or FIG. 16) and from such a position it is angularly displaceable, for example, through actuation means 5 or manually (see the variant illustrated in FIG. 11) into the first operating position. Of course, the tired wheel TW may also be moved, e.g., raised-lowered or moved laterally, in order to move it into the position with respect to the device 1 illustrated in FIG. 6, in which case the support arm may only be angularly displaceable between the first and second operating position.

The device 1 further comprises a demounting tool 4 for demounting a tired wheel TW, which may also be used for mounting a tired wheel TW, whereby the demounting tool 4 may be connected, preferably hinged directly or with interposition of another component (as referred to hereafter), to the support arm 3 so as to be angularly displaceable with respect to it. The demounting tool 4 may be angularly displaced with respect to the support arm 3, between a first operating position (see FIG. 6), for example, when the support arm 3 is in the first operating position, and a second operating position (see FIG. 7), for example, when the support arm 3 is in the second operating position. Such angular movement, as referred to hereafter, may be carried out by the force of reaction imparted to the tool by the wheel rim W and/or by the tire T.

Preferably, during the demounting operations, when the demounting tool 4 is in the second operating position, it may be inclined so as to have the free end 4*a* closer to the axis z-z of the wheel support means of the respective tire mounting-demounting machine than its connection end 4*d* for connection to the support arm 3, which is thus further from the axis z-z. If desired, the demounting tool 4 may be initially in rest position (see FIG. 1), and from this position, is angularly displaceable with respect to the support arm 3, for example manually, into the first operating position.

Preferably, when the demounting tool 4 is in the first operating position, the demounting tool 4 may be substantially parallel to the axis z-z.

The demounting tool 4 may have a substantially plate-like configuration with free end 4*a* for engaging beads of a tire, for example curved, possibly having one or a pair of bosses or enlarged portions 4*b* and 4*c* which may define respective engagement areas of the demounting tool 4.

Actuation means 5 for actuating the support arm 3 may also be provided, which may angularly move support arm 3 with respect to the base structure 2.

To this regard, the demounting tool 4 may be connected to the support arm 3 so as to be angularly displaceable with respect to it, so that by actuating the actuation means 5 the support arm 3 angularly moves, thereby causing the insertion or removal of the demounting tool 4 between tire T and wheel rim W, and therefore, the angular movement, for example, from the first to the second operating position, of the demounting tool 4 with respect to the support arm 5 carried out by the force of reaction imparted to the demounting tool 4 by the wheel rim W and/or by the tire T.

Preferably, the actuation means 5 may comprise an actuator, for example, electric, pneumatic or fluid-dynamic, articulated or connected, preferably hinged, on one side to the base structure 2, and articulated or connected, preferably hinged, on the other side to the support arm 3. According to the non-limiting example illustrated in the Figures, the actuator 5 comprises a cylinder 5*a* and a stem 5*b* slidably mounted in the cylinder 5*a*, with the cylinder 5*a* connected to the base structure 2 and the stem 5*b* connected to the support arm 3. It should be understood, however, that the cylinder 5*a* could be connected to the support arm 3 and the stem 5*b* connected to the base structure 2.

If desired, a gusset or plate, or a pair of gussets or plates 3*c*, to which the actuation means 5, for example, the tip of the stem 5*b*, are hinged, and may extend upwards from the support arm 3.

Advantageously, the demounting tool 4 may be substantially free to be angularly displaced with respect to the support arm 3. In other words, the demounting tool 4 may be connected to the support arm 3, so as to be able to be manually angularly displaced with respect to the latter. Preferably, when the demounting tool 4 is displaced manually, the support arm 3, due to the action of the actuation means 5, may be fixed in position or angularly displaced.

Possibly, the device 1 may comprise a spacer or extension element or component 6, which on one side is articulated to the support arm 3, and on the other side is connected or hinged to the demounting tool 4. Preferably, the spacer element 6 is hinged to the support arm 3, but it is substantially free to be angularly displaceable, also manually, with respect to the support arm 3. Preferably, when the spacer element 6 with the demounting tool 4 is displaced manually, the support arm 3, due to the action of the actuation means 5, may be fixed in position or angularly displaced.

According to the non-limiting embodiment illustrated in the Figures, the demounting tool 4 may be connected to the support arm 3 through, or with interposition of, the spacer element 6. When the demounting tool 4 is in the first operating position, it is preferably substantially aligned with the spacer component 6, whereas when the demounting tool 4 is in the second operating position, it is preferably in an inclined position with respect to the spacer component 6.

For the connection of the demounting tool 4 to the spacer element 6, a lever or connecting rod component 60 may be provided, which, on one side, is fixed or connected to the demounting tool 4 and, on the other side, may have one or more projections (not visible in the drawings) intended to snap-engage a plurality of recesses 6*a* (two according to the embodiment in the Figures) delimited on an outer face of the spacer element 6. Of course, the lever component 60 may be connected to the spacer element 6 and have a projection intended to snap-engage recesses in the demounting tool 4.

The recesses 6*a* may be formed or delimited, preferably, on the same face or surface of the extension component 6 or the demounting tool 4.

Due to the lever component 60, when force is applied to the demounting tool 4, preferably to the tip or free end thereof 4*a*, for example, a force of reaction of a tire or wheel rim during the mounting-demounting of a tired wheel, an angular movement of the demounting tool 4 is caused so as to move the projection or projections of the lever component 60 in one recess 6*a*, or in another recess according to the direction of application of the aforementioned force of reaction. The housing of the projection in a respective recess 6*a* ensures that the demounting tool 4 is kept in a respective or first angular position, and in order to move the demounting tool 4 from such position, force must be applied (for example through tire and wheel rim) such as to cause the projection to come out from such a recess 6*a* and make it slide on the side wall of the spacer element 6 until another recess 6*a* is reached, after which the demounting tool 4 is anchored in a second position, which is angularly spaced with respect to the previous or first position. Each recess 6*a* corresponds to a respective angular position of the demounting tool 4.

There may also be elastic loading means intended to oppose the angular movement of the demounting tool 4, with respect to the support arm 3 or of the spacer element 6, if foreseen, with respect to the support arm 3. However, such elastic loading means, preferably, may limit but does not prevent such angular movement.

Preferably, there are no active angular movement means, such as actuators, of the spacer element 6 with respect to the support arm 3 or of the demounting tool 4 with respect to the spacer element 6. Thanks to such expedient, it is possible to manually angularly move the demounting tool 4, and, if foreseen, the spacer element 6 with respect to the support arm 3. Such angular movement may also be obtained as a result of a force of reaction imparted by the wheel rim W or by the tire T to the demounting tool 4 during the demounting or mounting operations.

As an alternative to the lever component 60, the demounting tool 4 may be hinged to the spacer element 6. In that case, it would be possible to foresee a resistant elastic loading component, such as a spring intended to oppose without preventing the angular movement of the demounting tool 4 with respect to the spacer element 6. If there is no spacer element 6, then such elastic loading components could be foreseen between demounting tool 4 and support arm 3.

Preferably, the support arm 3 may be hinged to the base structure about a first hinging axis x-x, possibly through a pin 3d, whereas the demounting tool 4 or, if foreseen, the spacer element 6 is hinged, possibly through a pin 6b to the support arm 3 about a second hinging axis y-y substantially parallel to the first hinging axis x-x. According to the advantageous and non-limiting embodiment illustrated in the Figures, the hinging axes x-x and y-y are substantially horizontal.

Even more preferably, the hinging axes x-x and y-y may be substantially transversal, possibly perpendicular to the axis z-z. According to the embodiment illustrated in the Figures, the axes x-x and y-y may be substantially horizontal, whereas the axis z-z may be vertical or slightly inclined with respect to the vertical, but in any case, transversal to a horizontal plane and, consequently, to the axes x-x and y-y.

The base structure 2 can comprise an upright or column element 7, for example, substantially vertical or slightly inclined with respect to the vertical, as well as a projecting component or arm 8, possibly towards the front F of the device 1 or towards the demounting tool 4, which projecting component 8 has the lower end 8a connected to the upright element 7 and proximal to it, and the upper end 8b, if desired fork-shaped, distal from the upright element 7. In this case, the support arm 3 may be connected or hinged to the upper end 8b of the projecting component 8.

Preferably, the base structure 2 may also comprise one or more plates 9, for example, lying substantially parallel to the direction of main or greatest extension of the upright element 7 and fixed or connected, on one side, to the upright element 7 and, on the other side, to the projecting component 8. In accordance with the embodiment illustrated in the Figures, the plate(s) 9 has/have a substantially vertical lying position. Preferably, there are two substantially parallel plates 9, whereas the projecting component 8, or rather a lower end 8a thereof, is arranged and connected to them and between them.

Advantageously, the device 1 further comprises means for adjusting the inclination of the projecting component 8 with respect to the upright element 7. If there are one or more plates 9, the means for adjusting the inclination may vary the angular trim of the projecting component 8 with respect to them.

With particular reference to FIGS. 2 to 5, in one plate or in both the plates 9, a hole or opening may be formed, whereas in the lower end 8a of the projecting component 8, or in a sheet 8c, constrained or fixed to such an end 8a, two or more holes or openings 8d may be formed. By aligning the hole of the plate 9 with one of the holes 8d, the projecting component 8 is arranged with a certain inclination, after which the component 8, itself, may be fixed in position by inserting a pin or pawl 10 in the aligned holes. By aligning instead the holes of the plate 9 with the other or another hole 8d and then inserting the pawl 10 in such aligned holes, the projecting component 8 may be arranged with another inclination or trim. The pawl 10 may be elastically loaded and include a handle knob 10a to extract it from the aligned holes. Of course, there may be more than two holes in the projecting component 8, or two or more holes in one plate 9. Alternatively, should no plate 9 be provided, the holes for alignment with the holes 8d of the projecting component may be formed in the upright element 7.

In this case, the projecting component 8 may be hinged to a sheet 9, or to both (if foreseen) the sheets 9 through a pin 8e, also possibly able to be inserted at the lower end of the projecting component 8.

Moreover, on the outer surface of the projecting component 8, it may be possible to fix a block component 11 in which one or more pins or screws 11a (two according to the Figures) are fixed, possibly adjustably, each intended to abut against a plate 9, possibly against an edge 9a of the plate 9, when the projecting component 8 is positioned in a respective operative position. Due to the pins or screws 11a, it is possible to ensure a stable positioning of the projecting component 8 when this is arranged with a predetermined inclination or trim.

The base structure 2 may then comprise a framework or frame 12 to which the actuator 5, for example, the cylinder 5a or the stem 5b is connected, possibly hinged. The framework 12 can extend from the top of the upright element 7 towards the back R of the device 1 and include a forked terminal end 12a for housing the cylinder 5a of the actuator 5 between the respective tines.

The device 1 may also comprise means for controlling the actuation means 5, such as buttons 14, which may be arranged or engaged at the front F thereof. If the device 1 comprises a spacer element 6, then the buttons 14 may be foreseen at the portion for connecting, possibly hinging, the spacer element 6 to the support arm 3. Of course, the buttons 14 are in communication, for example, electric, hydraulic or pneumatic, with the actuation means 5.

The device 1 may also comprise a handle or the like 15 for controlling or manually angularly moving the demounting tool 4 and, if foreseen, the spacer component 6 with respect to the support arm 3. According to one embodiment illustrated in the Figures, the handle 15 may be fixed to the spacer component 6, for example, at the buttons 14, so that the operator may grip the handle 15 and simultaneously press one of the buttons 14.

A tire mounting-demounting machine 17, according to the present invention (see FIGS. 9 and 10), may comprise a base block 18, from which support means, such as a fastening and support table 19 of the wheel rim W of a tired wheel TW, upwardly protrude, as well as a device 1 as described above. If desired, the base structure 2 of the device 1 may be part of the machine itself, in which case the upright element 7 may rise up from the base block 18. Alternatively, the device 1 may constitute an independent group that is used in combination with a tire mounting-demounting machine 17.

The fastening and support table 19 may, for example, comprise jaws or another type. The table 19, moreover, may be mounted for rotation, possibly about an axis z-z, or may provide work tools, such as demounting tool 4 that is mounted for rotation or able to move like a turntable about the table 19. The rotation axis z-z of the table 19, or in any case, the axis of symmetry z-z thereof that, when in use, corresponds to the axis of the wheel TW or of the wheel rim W mounted and clamped on the table 19 may be vertical, horizontal or slightly oblique with respect to the vertical.

The tire mounting-demounting machine 17 may comprise two or more bead breaker groups 20a and 20b, each having a respective arm bearing or supporting, possibly mounted for rotation, and at least one bead-breaker roller 21. A bead-breaker roller 21 of a first bead-breaker group 20a may have the work front WF opposite to the work front WF of at least one bead-breaker roller 21 of the second bead-breaker group 20b. In the illustrated example, the work front WF of a roller 21 of the first bead-breaker group 20a faces downwards, whereas the work front WF of the roller 21 of the second bead-breaker group 20b faces upwards. The arms for supporting the rollers 21 may be mounted, preferably slidingly mounted, for example, vertically or parallel to the axis z-z.

Moreover, the tire mounting-demounting machine 17 may comprise first moving means 22a, for example, a first actuator for a first bead-breaker group 20a, or rather for the respective arm for supporting the roller 21 and second moving means 22b, for example, a second actuator, for a second bead-breaker group 20b or rather for the respective arm for supporting the rollers 21, the second moving means 22b being different and unconstrained by the first moving means 22a, so that it is possible to separately actuate the two bead-breaker groups 20a and 20b, or rather to move the respective roller support arms.

With device 1, according to the present invention, after having locked in position a tired wheel TW to be demounted, preferably after having fixed or locked it on support means, such as a wheel-bearing table 19 (possibly through jaws or another suitable clamping method or device) and suitably bead broken, for example, through the aforementioned bead-breaker groups 20a and 20b, the actuation means 5 are preferably actuated so as to angularly displace the support arm 3 from the rest position to the first operating position (see FIG. 6), thereby approaching the demounting tool 4, possibly even moving it or controlling it manually, up to the circumferential outer area of the tired wheel TW of contact between tire T and wheel rim W, preferably resting on a portion of the first edge W1 of the wheel rim W and on a portion of the first bead T1 of the tire. Alternatively, it is possible to move the tired wheel TW so as to bring it in contact with the demounting tool 4, in which case the support arm 3 may not need to be displaced from an initial rest position to the first operating position.

At this point, by controlling the actuation means 5, but possibly also manually controlling or moving the demounting tool 4, for example, if foreseen, the spacer component 6, the support arm 3 may be displaced into the second operating position (see FIG. 7), thus fully introducing the demounting tool 4 between tire T and wheel rim W, which causes the angular displacement of the demounting tool 4 with respect to the support arm 3 and, if foreseen, with respect to the spacer component 6. During this step, the demounting tool 4 may be arranged substantially inclined, with the free end 4a closer to the axis z-z and the connection end 4d to the support arm 3 further from such an axis z-z, and whereby the demounting tool 4 may also grasp a portion of a first bead T1 of the tire. The angular movement of the demounting tool 4 during this step is obtained following a force of reaction imparted by the wheel rim W or by the tire T to the demounting tool 4.

During this step, moreover, in order to facilitate the insertion of the demounting tool 4 between tire T and wheel rim W, it is also possible to set in rotation the tired wheel TW, for example, through rotation of the support table 19.

Figure 8:
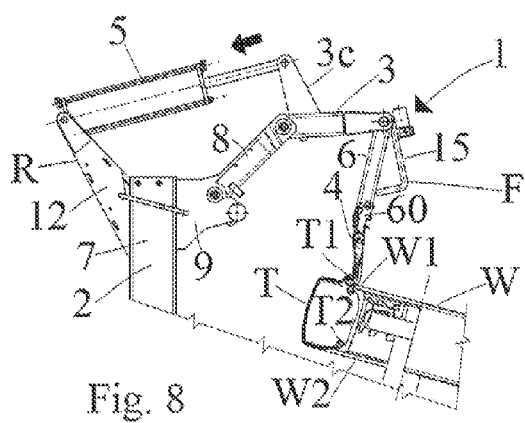

When the demounting tool 4 has grasped a portion of the tire, the actuation means 5 are backwards controlled so as to bring the support arm 3 and the demounting tool 4 back into the first operating position (see FIG. 8). Also during this step, preferably, the demounting tool 4 may be manually driven or controlled, possibly at the spacer component 6, if foreseen, for example, through the handle 15.

The demounting tool 4 is thus brought back into the first operating position together with the grasped portion of the first bead T1 of the tire T, in which it rests on the portion of the first edge W1 of the wheel rim exactly as before controlling its full insertion between tire and wheel rim, in other words, in the position illustrated in FIG. 6. During such a step, therefore, the demounting tool 4 carries the grasped portion of the first bead T1 beyond the respective first edge W1 of the wheel rim or outside the area between first and second edge of the wheel rim.

At this point the tired wheel TW is set into rotation, or the demounting tool 4 is set in rotation about the tired wheel TW, thus completing the demounting of the first bead T1 of the tire, which means that the entire first bead T1 is brought beyond the respective first edge W1 of the wheel rim or outside the area between first W1 and second W2 edge of the wheel rim W.

In order to also demount the second bead T2 of the tire T, it is possible to act through a suitable tool, such as a lever, or the second bead T2 can be pushed towards the first edge W1, until it passes beyond it through one of the bead-breaker groups 20a and 20b (according to the example in the Figures through the bead-breaker group 20b or rather through the respective roller 21), and the second bead T2 can be guided to pass beyond the first edge W1 also, possibly, with the help of the demounting tool 4.

For mounting a tire T on a wheel rim W, the sequence of steps is substantially the reverse of what is described above and, possibly, auxiliary tools are used, such as rollers or the like that help the demounting tool 4 in its operations.

With particular reference to FIGS. 11 to 16, a device 1 similar to the one above-shown is illustrated, but having means for the displacement or sliding of said first actuation means 5. In particular, the cylinder 5a or the stem 5b of the actuator 5, may allow the actuation means to be displaced and, with it, the support arm 3 and the demounting tool 4.

Preferably, the displacement or sliding means may comprise a bar or rod 23, a first end 23a of which is constrained to the actuation means 5, for example, to the cylinder 5a of the actuator 5, whereas another or second end 23b, possibly free, may be slidingly mounted in a respective opening or seat, possibly delimited by a sleeve 24. The rod or bar 23 is preferably substantially parallel to the stem 5b of the actuator 5, even more preferably aligned with it.

The moving or sliding means may also comprise a throttling or locking component 25 for throttling or locking the sliding of the bar or rod 23, possibly with respect to the sleeve 24.

Advantageously, the device 1 may comprise an elastic loading means 26 for elastically loading the second end 23b intended to oppose the displacements of the bar or rod 23. The elastic loading means 26 may comprise a spring, possibly helical mounted coaxially on the bar 23, preferably at the second end 23b of the bar 23.

Even more advantageously, the elastic loading means 26 may act between the sleeve 24 and the second end 23b, possibly between an end abutment portion of the latter.

According to such a variant, one or more buttons 27 for locking-unlocking the throttling or locking component 25 are also foreseen, which buttons 27 preferably being provided and able to be engaged by the operator at the other buttons 14 and the handle 15. The buttons 27 are in communication, for example, electric or pneumatic, with the throttling or locking component 25.

Therefore, according to the variant now under examination, it is possible, once the moving or sliding means have been unlocked, to angularly move, even possibly manually, for example by acting on the handle 15, both the support arm 3 with respect to the support structure, and the demounting tool 4 or rather the spacer component 6 with respect to the support arm 3.

In order to demount a tired wheel with a device 1, like the one described now, one proceeds as described with reference to the device 1 illustrated in FIGS. 1 to 10, although the device 1 now described is faster and simpler to be used because it is possible to take the demounting tool 4 into the first operating position much faster, in other words in contact with the wheel rim and the tire at the circumferential outer area of the tired wheel TW of contact between tire T and wheel rim W, unlocking the throttling or locking means 25 and thus moving, possibly manually, the support arm 3, the demounting tool 4 and the actuation means 5, for example, by acting on the handle 15, if foreseen. Then the throttling or locking means 25 may be locked and one proceeds as described above controlling the actuation means 5.

As will be understood, a device 1 according to the present invention makes it possible to position the respective demounting tool 4 during all of the mounting and demounting steps, taking into account the fact, in particular, that due to the presence of the actuation means 5, it is possible to move the support arm 3, and therefore the demounting tool 4, from the first operating position to the second operating position, and then back into the first operating position or initial operating position, which ensures that, at the end, the support arm 3 and the demounting tool 4 are brought back into the initial position, in particular, into the position in which the demounting tool 4 is in contact with, and resting on, the wheel rim exactly as it was before controlling the insertion of the demounting tool 4 between tire and wheel rim.

Modifications and variants of the invention are possible within the scope of protection defined by the claims.

The invention claimed is:

1. A device for demounting a tired wheel comprising:
   at least one base structure,
   at least one support arm connected to said at least one base structure so as to be angularly displaceable with respect thereto,
   actuation means for actuating said at least one support arm and configured to angularly displace said at least one support arm with respect to said at least one base structure, and
   a demounting tool connected to said at least one support arm so as to be angularly displaceable with respect thereto, so that by actuating said actuation means said at least one support arm is angularly displaced, thereby causing the insertion and/or removal of said demounting tool between a tire and a wheel rim of said tired wheel and thus the angular displacement of said demounting tool with respect to said at least one support arm by the force of reaction imparted thereto by said wheel rim and/or by said tire.

2. The device according to claim 1, wherein said demounting tool is connected to said at least one support arm, so as to be manually angularly displaceable with respect thereto.

3. The device according to claim 1, wherein said actuation means comprise an actuator, on one side, articulated or fixed to said at least one base structure and, on the other side, articulated or fixed to said at least one support arm.

4. The device according to claim 1, comprising at least one spacer or extension element, on one side, articulated to said at least one support arm and, on the other side, connected or hinged to said demounting tool.

5. The device according to claim 1, wherein said at least one support arm is hinged to said at least one base structure about a first hinging axis, whereas said demounting tool is hinged to said at least one support arm about a second hinging axis substantially parallel to said first hinging axis.

6. The device according to claim 1, wherein said at least one base structure comprises an upright element as well as a projecting component having a lower end connected to said upright element and proximal thereto and an upper end distal from said upright element, said at least one support arm being connected or hinged to said upper end of said projecting component.

7. The device according to claim 6, comprising means for adjusting the inclination of said projecting component with respect to said upright element.

8. The device according to claim 1, comprising means for the displacement or sliding of said first actuation means designed to allow the displacement of said actuation means, said at least one support arm, and said demounting tool.

9. The device according to claim 8, wherein said displacement or sliding means comprise a bar or rod, one first end thereof is constrained to said actuation means, whereas another end thereof or second end is slidingly mounted within a respective opening or seat, and comprising a throttling or locking component for throttling or locking the sliding of said bar or rod.

10. The device according to claim 9, wherein said bar or rod is substantially parallel to a stem of said actuation means.

11. The device according to claim 9, comprising means for elastically loading said second end of said bar or rod, which means are designed to oppose the displacements of said bar or rod.

12. A tire mounting-demounting machine comprising a base, at least one fastening and support table of a wheel rim of a tired wheel, and the device according to claim 1.

13. The tire mounting-demounting machine according to claim 12, further comprising at least two bead breaker groups each having a respective arm bearing at least one bead breaker roller, a bead breaker roller of a first bead breaker group having the work front opposite to the work front of at least one bead breaker roller of a second bead breaker group.

14. The tire mounting-demounting machine according to claim 13, further comprising first moving means for moving a first bead breaker group and second moving means for moving a second bead breaker group different and independent from said first moving means for moving.

15. A method for demounting a first bead of a tire from a wheel rim of a tired wheel, comprising the following steps:
   arranging a device for demounting a tired wheel comprising:
   at least one base structure, at least one support arm connected to said at least one base structure so as to be angularly displaceable with respect thereto, actuation means for actuating said at least one support arm and configured to angularly displace said at least one support arm with respect to said at least one base structure, a demounting tool connected to said at least one support arm so as to be angularly displaceable with respect thereto, so that by actuating said actuation means said at least one support arm is angularly displaced, thereby causing the insertion or removal of said demounting tool between said tire and said wheel rim of said tired wheel and thus the angular displacement of said demounting tool with respect to said at least one support arm by the force of reaction imparted thereto by said wheel rim and/or by said tire, locking in position said tired wheel to be demounted on support means, locating said demounting tool at an outer circumferential area of said tired wheel at which area the tire and the wheel rim are in contact with one another, controlling said actuation means so as to angularly displace said at least one support arm from a first operating position to a second operating position, thereby introducing said demounting tool between the tire and the wheel rim, thus determining an angular displacement of said demounting tool with respect to said at least one support arm by the force of reaction imparted thereto by said wheel rim and/or by said tire, until said demounting tool grasps a portion of the first bead of the tire through a free end thereof;

backwardly controlling said actuation means, so as to bring said at least one support arm in said first operating position back and said demounting tool with the grasped portion of said first bead beyond a first edge of the wheel rim or outside an area between the first edge and a second edge of the wheel rim; and rotating said tired wheel or said demounting tool, so as to complete the demounting of the first bead of said tire.

16. The method according to claim 15, wherein said demounting tool is manually guided during said controlling step of said actuation means in which said at least one support arm is angularly displaced from said first operating position to said second operating position or vice versa.

17. The method according to claim 15, wherein said demounting tool is arranged at a circumferential external area by actuating said actuation means so as to angularly move said at least one support arm from a rest position to said first operating position.

18. The method according to claim 17, wherein said demounting tool is manually guided during said step of actuating said actuation means in which said at least one support arm is angularly displaced from said rest position to said first operating position.

19. The method according to claim 15, wherein when said at least one support arm is in said first operating position, said demounting tool rests on a portion of the first edge of said wheel rim.

20. The method according to claim 15, further comprising demounting of a second bead of said tire by pushing said second bead towards said first edge up to surmounting it through a first bead breaker group or a second bead breaker group.

* * * * *